United States Patent
Kim

(10) Patent No.: US 8,577,413 B2
(45) Date of Patent: Nov. 5, 2013

(54) MOBILE TERMINAL AND METHOD OF OPERATING THE SAME, AND IDENTIFY MODULE CARD

(75) Inventor: Hyoungtaik Kim, Seoul (KR)

(73) Assignee: LG Electronics Inc., Seoul (KR)

( * ) Notice: Subject to any disclaimer, the term of this patent is extended or adjusted under 35 U.S.C. 154(b) by 121 days.

(21) Appl. No.: 13/174,376

(22) Filed: Jun. 30, 2011

(65) Prior Publication Data

US 2012/0064945 A1 Mar. 15, 2012

(30) Foreign Application Priority Data

Sep. 14, 2010 (KR) ........................ 10-2010-0089796

(51) Int. Cl.
*H04M 1/00* (2006.01)
*H04M 3/00* (2006.01)

(52) U.S. Cl.
USPC ............................................ 455/558; 455/418

(58) Field of Classification Search
USPC ......................................... 455/418, 557, 558
See application file for complete search history.

(56) References Cited

U.S. PATENT DOCUMENTS

| | | | |
|---|---|---|---|
| 7,075,893 B1* | 7/2006 | Mlinarsky et al. | 370/241 |
| 7,353,044 B2* | 4/2008 | Nachef | 455/558 |
| 8,010,096 B2* | 8/2011 | Kahler et al. | 455/418 |
| 2008/0081609 A1* | 4/2008 | Burgan et al. | 455/425 |
| 2009/0291712 A1* | 11/2009 | Park et al. | 455/558 |
| 2009/0325615 A1* | 12/2009 | McKay et al. | 455/466 |

FOREIGN PATENT DOCUMENTS

| | | |
|---|---|---|
| CN | 1932758 | 3/2007 |
| EP | 1051052 | 11/2000 |
| EP | 1 223 768 | 7/2002 |
| WO | WO 00/41409 | 7/2000 |
| WO | WO 01/84512 | 11/2001 |
| WO | WO 02/07080 | 1/2002 |

OTHER PUBLICATIONS

European Search Report dated Jan. 9, 2012 for Application 11175446.1.
Paul C. Clark et al., "BITS: A Smartcard Protected Operating System." Communications of the Association for Computing Machinery, ACM, New York, NY. vol. 37, No. 11, Nov. 1, 1994, pp. 66-70, 94.
Chinese Office Action for Application No. 201110269213, dated Jul. 11, 2013 (Full Chinese Text with English Translation).

* cited by examiner

*Primary Examiner* — Christopher M Brandt
(74) *Attorney, Agent, or Firm* — KED & Associates LLP

(57) ABSTRACT

Disclosed is a mobile terminal. The mobile terminal may comprise a card slot and controller. The card slot may have any one of a plurality of identity module cards in each of which user ID information and a different Operating System (OS) are stored mounted thereon. The controller may execute the OS stored in the mounted identity module card and perform user certification on the basis of the user ID information stored in the mounted identity module card, when the one identity module card is mounted on the card slot.

7 Claims, 15 Drawing Sheets

MOBILE TERMINAL AND METHOD OF OPERATING THE SAME, AND IDENTIFY MODULE CARD

CROSS-REFERENCE TO RELATED APPLICATION(S)

This application claims priority under 35 U.S.C. §119 to Korean Application No. 10-2010-0089796 filed on Sep. 14, 2010, whose entire disclosure(s) is/are hereby incorporated by reference.

BACKGROUND

1. Field

This document relates to a mobile terminal and a method of driving the same, in which a variety of Operating Systems (hereinafter referred to as an 'OS') can be driven.

2. Background

With the spread of mobile terminals and the activation of user-based application stores, the paradigm of the mobile terminal-related industry is changing. However, there are many cases in which applications produced for a specific OS are not executed in mobile terminals at which another OS is installed.

SUMMARY

In accordance with the mobile terminal according to this document, the following advantages may be expected. In accordance with a mobile terminal and a method of driving the same according to an embodiment of this document, a user may use dedicated applications for a plurality of respective OSs by driving the mobile terminal in a plurality of OS environments.

In accordance with a mobile terminal and a method of driving the same according to an embodiment of this document, some of hardware elements embedded in the main body of the mobile terminal is mounted on an identity module card. Accordingly, the hardware configuration of the terminal body may be simplified.

A mobile terminal according to an embodiment of this document may comprise a card slot and a controller. Any one of a plurality of identity module cards in each of which user ID information and a different Operating System (OS) are stored may be mounted on the card slot. The controller may execute the OS stored in the mounted identity module card and perform user certification on the basis of the user ID information stored in the mounted identity module card, when the one identity module card is mounted on the card slot.

A mobile terminal according to another embodiment of this document may comprise a card slot and a controller. An identity module card in which user ID information and a plurality of OSs are stored may be mounted on the card slot. The controller may select and execute any one of the plurality of OSs and perform user certification on the basis of the user ID information, when the identity module card is mounted on the card slot.

A method of driving the mobile terminal according to an embodiment of this document may comprise, when any one of a plurality of identity module cards in each of which user ID information and a different OS are stored is mounted on a card slot, executing the OS stored in the mounted identity module card and performing user certification on the basis of the user ID information.

A method of driving the mobile terminal according to another embodiment of this document may comprise, when an identity module card in which user ID information and a plurality of OSs are stored is mounted on a card slot, executing an OS selected from the plurality of OSs and performing user certification on the basis of the user ID information.

An identity module card according to an embodiment of this document may comprise an identity module, memory, and a controller. The identity module may store user ID information. The memory may store a plurality of OSs. When the identity module card is mounted on a mobile terminal, the controller may execute an OS selected from among the plurality of OSs and perform user certification on the basis of the user ID information.

An identity module card according to another embodiment of this document may comprise an identity module, memory, and a controller. The identity module may store user ID information. The memory may store a specific OS. When the identity module card is mounted on a mobile terminal, the controller may execute the specific OS and perform user certification on the basis of the user ID information.

BRIEF DESCRIPTION OF THE DRAWINGS

The embodiments will be described in detail with reference to the following drawings in which like reference numerals refer to like elements wherein.

DETAILED DESCRIPTION

The present invention will now be described more fully with reference to the accompanying drawings, in which exemplary embodiments of the invention are shown. The invention may, however, be embodied in many different forms and should not be construed as being limited to the embodiments set forth herein; rather, there embodiments are provided so that this disclosure will be thorough and complete, and will fully convey the concept of the invention to those skilled in the art.

Hereinafter, a mobile terminal relating to the present invention will be described below in more detail with reference to the accompanying drawings. In the following description, suffixes "module" and "unit" are given to components of the mobile terminal in consideration of only facilitation of description and do not have meanings or functions discriminated from each other.

The mobile terminal described in the specification can include a cellular phone, a smart phone, a laptop computer, a digital broadcasting terminal, personal digital assistants (PDA), a portable multimedia player (PMP), a navigation system and so on.

Figure 1:
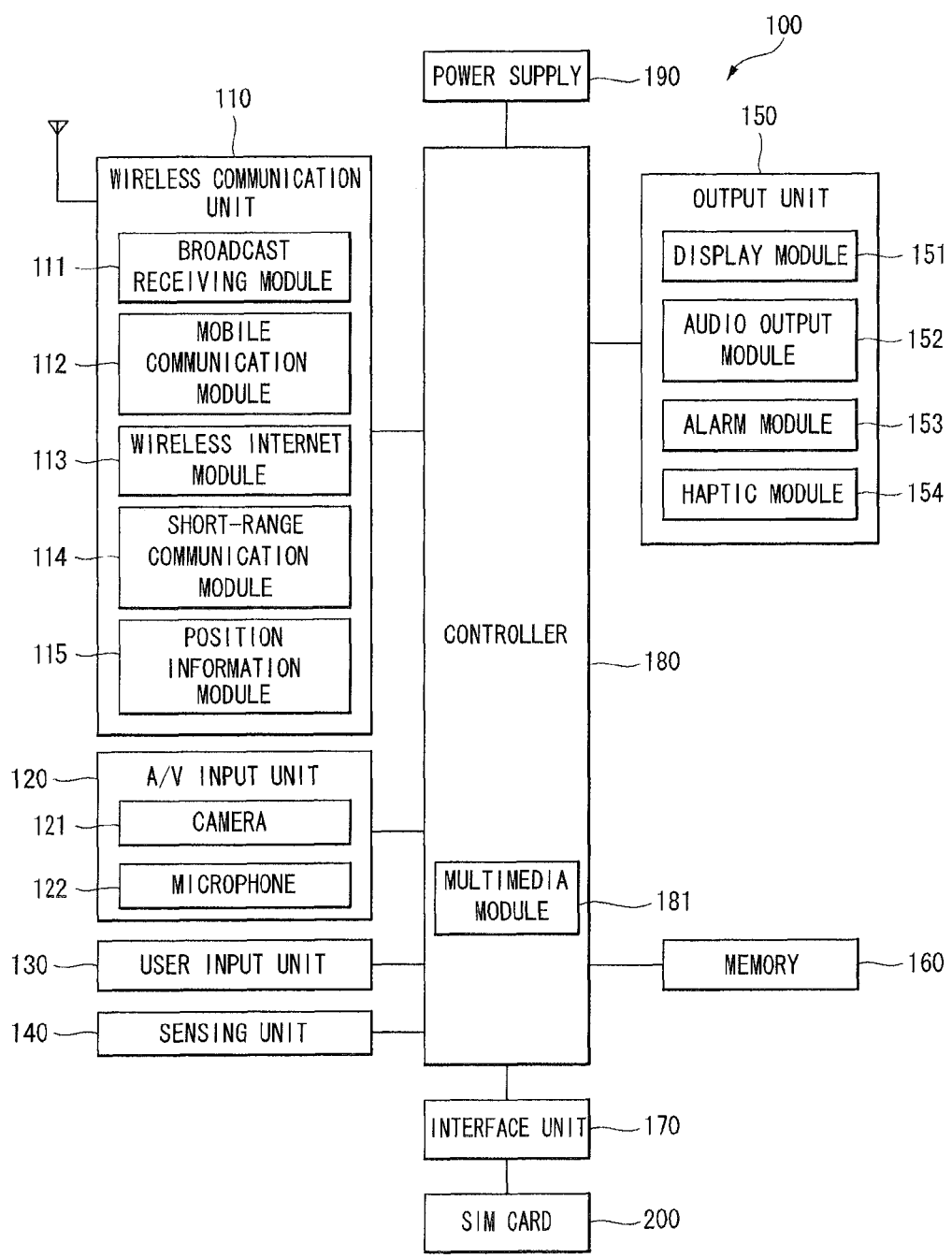
FIG. 1 is a block diagram of a mobile terminal according to an embodiment of this document.

FIG. 1 is a block diagram of an implementation of a mobile terminal 100. The mobile terminal 100 can include a radio communication unit 110, an audio/video (A/V) input unit 120, a user input unit 130, a sensing unit 140, an output unit 150, a memory 160, an interface unit 170, a controller 180, and a power supply 190. The components shown in FIG. 1 are not essential parts and the number of components included in the mobile terminal can be varied.

The components of the mobile terminal will now be described.

The radio communication unit 110 can include at least one module that enables radio communication between the mobile terminal 100 and a radio communication system or between the mobile terminal 100 and a network in which the mobile terminal 100 is located. For example, the radio communication unit 110 can include a broadcasting receiving module 111, a mobile communication module 112, a wireless Internet module 113, a local area communication module 114 and a position information module 115.

The broadcasting receiving module 111 receives broadcasting signals and/or broadcasting related information from an external broadcasting management server through a broadcasting channel.

The broadcasting channel can include a satellite channel and a terrestrial channel. The broadcasting management server can be a server that generates and transmits broadcasting signals and/or broadcasting related information or a server that receives previously created broadcasting signals and/or broadcasting related information and transmits the broadcasting signals and/or broadcasting related information to a terminal. The broadcasting signals can include not only TV broadcasting signals, radio broadcasting signals and data broadcasting signals but also signals in the form of combination of a TV broadcasting signal and a radio broadcasting signal.

The broadcasting related information can be information on a broadcasting channel, a broadcasting program or a broadcasting service provider. The broadcasting related information can be provided even through a mobile communication network. In this case, the broadcasting related information can be received by the mobile communication module 112.

The broadcasting related information can exist in various forms. For example, the broadcasting related information can exist in the form of electronic program guide (EPG) of digital multimedia broadcasting (DMB) or in the form of electronic service guide (ESG) of digital video broadcast-handheld (DVB-H).

The broadcasting receiving module 111 receives broadcasting signals using various broadcasting systems. Particularly, the broadcasting receiving module 111 can receive digital broadcasting signals using digital broadcasting systems such as digital multimedia broadcasting-terrestrial (DMB-T), digital multimedia broadcasting-satellite (DMB-S), media forward link only (MediaFLO), DVB-H and integrated services digital broadcast-terrestrial (ISDB-T) systems. The broadcasting receiving module 111 can be constructed to be suited to broadcasting systems providing broadcasting signals other than the above-described digital broadcasting systems.

The broadcasting signals and/or broadcasting related information received through the broadcasting receiving module 111 can be stored in the memory 160. The mobile communication module 112 transmits/receives a radio signal to/from at least one of a base station, an external terminal and a server on a mobile communication network. The radio signal can include a voice call signal, a video telephony call signal or data in various forms according to transmission and receiving of text/multimedia messages.

The wireless Internet module 113 means a module for wireless Internet access and can be included in the mobile terminal 100 or externally attached to the mobile terminal 100. Wireless LAN (WLAN) (Wi-Fi), wireless broadband (Wibro), world interoperability for microwave access (Wimax), high speed downlink packet access (HSDPA) and so on can be used as a wireless Internet technique.

The local area communication module 114 means a module for local area communication. Bluetooth, radio frequency identification (RFID), infrared data association (IrDA), ultra wideband (UWB) and ZigBee can be used as a local area communication technique.

The position information module 115 confirms or obtains the position of the mobile terminal. A global positioning system (GPS) module is a representative example of the position information module 115. According to the current technology, the GPS module 115 can calculate information on distances between one point (object) and at least three satellites and information on the time when the distance information is measured and apply trigonometry to the obtained distance information to obtain three-dimensional position information on the point (object) according to latitude, longitude and altitude at a predetermined time.

Furthermore, a method of calculating position and time information using three satellites and correcting the calculated position and time information using another satellite is also used. In addition, the GPS module 115 continuously calculates the current position in real time and calculates velocity information using the position information.

Referring to FIG. 1, the A/V input unit 120 is used to input an audio signal or a video signal and can include a camera 121 and a microphone 122. The camera 121 processes image frames of still images or moving images obtained by an image sensor in a video telephony mode or a photographing mode. The processed image frames can be displayed on a display unit 151.

The image frames processed by the camera 121 can be stored in the memory 160 or transmitted to an external device through the radio communication unit 110. The mobile terminal 100 can include at least two cameras according to constitution of the terminal.

The microphone 122 receives an external audio signal in a call mode, a recording mode or a speed recognition mode and processes the received audio signal into electric audio data. The audio data can be converted into a form that can be transmitted to a mobile communication base station through the mobile communication module 112 and output in the call mode. The microphone 122 can employ various noise removal algorithms for removing noise generated when the external audio signal is received.

The user input unit 130 receives input data for controlling the operation of the terminal from a user. The user input unit 130 can include a keypad, a dome switch, a touch pad (constant voltage/capacitance), jog wheel, jog switch and so on.

The sensing unit 140 senses the current state of the mobile terminal 100, such as open/close state of the mobile terminal 100, the position of the mobile terminal 100, whether a user touches the mobile terminal 100, the direction of the mobile terminal 100 and acceleration/deceleration of the mobile terminal 100 and generates a sensing signal for controlling the operation of the mobile terminal 100. For example, the sensing unit 140 can sense whether a slide phone is opened or closed when the mobile terminal 100 is the slide phone. Furthermore, the sensing unit 140 can sense whether the power supply 190 supplies power and whether the interface unit 170 is connected to an external device. The sensing unit 140 can include a proximity sensor.

The output unit 150 generates visual, auditory or tactile output and can include the display unit 151, an audio output module 152, an alarm module 153 and a haptic module 154.

The display unit 151 displays information processed by the mobile terminal 100. For example, the display unit 151 displays UI or graphic user interface (GUI) related to a telephone call when the mobile terminal is in the call mode. The display unit 151 displays a captured or/and received image, UI or GUI when the mobile terminal 100 is in the video telephony mode or the photographing mode.

The display unit 151 can include at least one of a liquid crystal display, a thin film transistor liquid crystal display, an organic light-emitting diode display, a flexible display and a three-dimensional display.

Some of these displays can be of a transparent type or a light transmission type. This can be referred to as a transparent display. The transparent display includes a transparent liquid crystal display. The rear structure of the display unit 151 can also be of the light transmission type. According to this structure, a user can see an object located behind the body of the mobile terminal 100 through an area of the body of the mobile terminal 100, which is occupied by the display unit 151.

The mobile terminal 100 can include at least two display modules 151 according to constitution of the terminal. For example, the mobile terminal 100 can include a plurality of displays that are arranged on a single face at a predetermined distance or integrated. Otherwise, the plurality of displays can be arranged on different sides.

In the case where the display unit 151 and a sensor sensing touch (referred to as a touch sensor hereinafter) form a layered structure, which is referred to as a touch screen hereinafter, the display unit 151 can be used as an input device in addition to an output device. The touch sensor can be in the form of a touch film, a touch sheet and a touch pad, for example.

The touch sensor can be constructed such that it converts a variation in pressure applied to a specific portion of the display unit 151 or a variation in capacitance generated at a specific portion of the display unit 151 into an electric input signal. The touch sensor can be constructed such that it can sense pressure of touch as well as the position and area of touch.

When touch input is applied to the touch sensor, a signal corresponding to the touch input is transmitted to a touch controller. The touch controller processes the signal and transmits data corresponding to the processed signal to the controller 180. Accordingly, the controller 180 can detect a touched portion of the display 151.

Referring to FIG. 1, the proximity sensor 141 can be located in an internal region of the mobile terminal, surrounded by the touch screen, or near the touch screen. The proximity sensor senses an object approaching a predetermined sensing face or an object located near the proximity sensor using electromagnetic force or infrared rays without having mechanical contact. The proximity sensor has lifetime longer than that of a contact sensor and has wide application.

The proximity sensor includes a transmission type photo-electric sensor, a direct reflection type photo-electric sensor, a mirror reflection type photo-electric sensor, a high-frequency oscillating proximity sensor, a capacitive proximity sensor, a magnetic proximity sensor, an infrared proximity sensor, etc.

A capacitive touch screen is constructed such that proximity of a pointer is detected through a variation in an electric field according to the proximity of the pointer. In this case, the touch screen (touch sensor) can be classified as a proximity sensor.

For convenience of explanation, an action of approaching the pointer to the touch screen while the pointer it not being in contact with the touch screen such that location of the pointer on the touch screen is recognized is referred to as "proximity touch" and an action of bring the pointer into contact with the touch screen is referred to as "contact touch" in the following description. A proximity touch point of the pointer on the touch screen means a point of the touch screen to which the pointer corresponds perpendicularly to the touch screen when the pointer proximity-touches the touch screen.

The proximity sensor senses proximity touch and a proximity touch pattern (for example, a proximity touch distance, a proximity touch direction, a proximity touch velocity, a proximity touch time, a proximity touch position, a proximity touch moving state, etc.). Information corresponding to the sensed proximity touch action and proximity touch pattern can be displayed on the touch screen.

The audio output module 152 can output audio data received from the radio communication unit 110 or stored in the memory 160 in a call signal receiving mode, a telephone call mode or a recording mode, a speech recognition mode and a broadcasting receiving mode. The audio output module 152 outputs audio signals related to functions (for example, a call signal incoming tone, a message incoming tone, etc.) performed in the mobile terminal 100. The audio output module 152 can include a receiver, a speaker, a buzzer, etc.

The alarm module 153 outputs a signal for indicating generation of an event of the mobile terminal 100. Examples of events generated in the mobile terminal include receiving of a call signal, receiving of a message, input of a key signal, input of touch, etc. The alarm module 153 can output signals in forms different from video signals or audio signals, for example, a signal for indicating generation of an event through vibration. The video signals or the audio signals can be also output through the display unit 151 or the audio output module 152.

The haptic module 154 generates various haptic effects that the user can feel. A representative example of the haptic effects is vibration. The intensity and pattern of vibration generated by the haptic module 154 can be controlled. For example, different vibrations can be combined and output or sequentially output.

The haptic module 154 can generate a variety of haptic effects including an effect of stimulus according to arrangement of pins vertically moving for a contact skin face, an effect of stimulus according to jet force or sucking force of air through a jet hole or a sucking hole, an effect of stimulus rubbing the skin, an effect of stimulus according to contact of an electrode, an effect of stimulus using electrostatic force and an effect according to reproduction of cold and warmth using an element capable of absorbing or radiating heat in addition to vibrations.

The haptic module 154 can not only transmit haptic effects through direct contact but also allow the user to feel haptic effects through kinesthetic sense of his fingers or arms. The mobile terminal 100 can include at least two haptic modules 154 according to constitution of the mobile terminal.

The memory 160 can store a program for the operation of the controller 180 and temporarily store input/output data (for example, phone book, messages, still images, moving images, etc.). The memory 160 can store data about vibrations and sounds in various patterns, which are output from when a touch input is applied to the touch screen.

The memory 160 can include at least one of a flash memory, a hard disk type memory, a multimedia card micro type memory, a card type memory (for example, SD or XD memory), a random access memory (RAM), a static RAM (SRAM), a read-only memory (ROM), an electrically erasable programmable ROM (EEPROM), a programmable ROM (PROM) magnetic memory, a magnetic disk and an optical disk. The mobile terminal 100 can operate in relation to a web storage performing the storing function of the memory 160 on the Internet.

The interface unit 170 serves as a path to all external devices connected to the mobile terminal 100. The interface unit 170 receives data from the external devices or power and transmits the data or power to the internal components of the mobile terminal 100 or transmits data of the mobile terminal 100 to the external devices.

The interface unit 170 can include a wired/wireless headset port, an external charger port, a wired/wireless data port, a memory card port, a port for connecting a device having a user identification module, an audio I/O port, a video I/O port, an earphone port, etc., for example.

An identification module is a chip that stores information for authenticating the authority to use the mobile terminal 100 and can include a user identify module (UIM), a subscriber identify module (SIM) and a universal subscriber identify module (USIM). A device (referred to as an identification device hereinafter) including the identification module can be manufactured in the form of a smart card. Accordingly, the identification device can be connected to the mobile terminal 100 through a card slot included in the interface unit 170.

From FIG. 1, it can be seen that one SIM card 200 (that is, a kind of an identity module card) is connected to the mobile terminal 100 through the interface unit 170. However, this is only an exemplary implementation of this document, and a plurality of the SIM cards or at least another identity module may be connected to the mobile terminal 100 through the interface unit 170.

The interface unit 170 can serve as a path through which power from an external cradle is provided to the mobile terminal 100 when the mobile terminal 100 is connected to the external cradle or a path through which various command signals inputted by the user through the cradle to the mobile terminal 100. The various command signals or power input from the cradle can be used as a signal for confirming whether the mobile terminal 100 is correctly set in the cradle.

The controller 180 controls the overall operation of the mobile terminal. For example, the controller 180 performs control and processing for voice communication, data communication and video telephony. The controller 180 can include a multimedia module 181 for playing multimedia. The multimedia module 181 can be included in the controller 180 or separated from the controller 180.

The controller 180 can perform a pattern recognition process capable of recognizing handwriting input or picture-drawing input applied to the touch screen as characters or images.

The power supply 190 receives external power and internal power and provides power required for the operations of the components of the mobile terminal under the control of the controller 180.

Various embodiments of the inventive concept can be implemented in a computer or similar device readable recording medium using software, hardware or a combination thereof, for example.

According to hardware implementation, the embodiments of the inventive concept can be implemented using at least one of application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, electrical units for executing functions. In some cases, the embodiments can be implemented by the controller 180.

According to software implementation, embodiments such as procedures or functions can be implemented with a separate software module executing at least one function or operation. Software codes can be implemented according to a software application written in an appropriate software language. Furthermore, the software codes can be stored in the memory 160 and executed by the controller 180.

A general operation and functions of the mobile terminal 100 according to this document have been described above with reference to FIG. 1. Hereinafter, embodiments of the mobile terminal according to this document in which all dedicated applications for a plurality of respective OSs may be executed in a plurality of OS environments or a hardware configuration is simplified by mounting some of a hardware configuration, embedded in the main body of the mobile terminal, on the identity module card are described in more detail with reference to FIGS. 2 to 15.

The embodiments of the mobile terminal according to this document are described on the assumption that the identity module mounted on the mobile terminal 100 according to this document is an SIM card of a card type and the SIM card is mounted on the mobile terminal 100 through a card slot. However, the scope of this document is not limited thereto.

Figure 2:
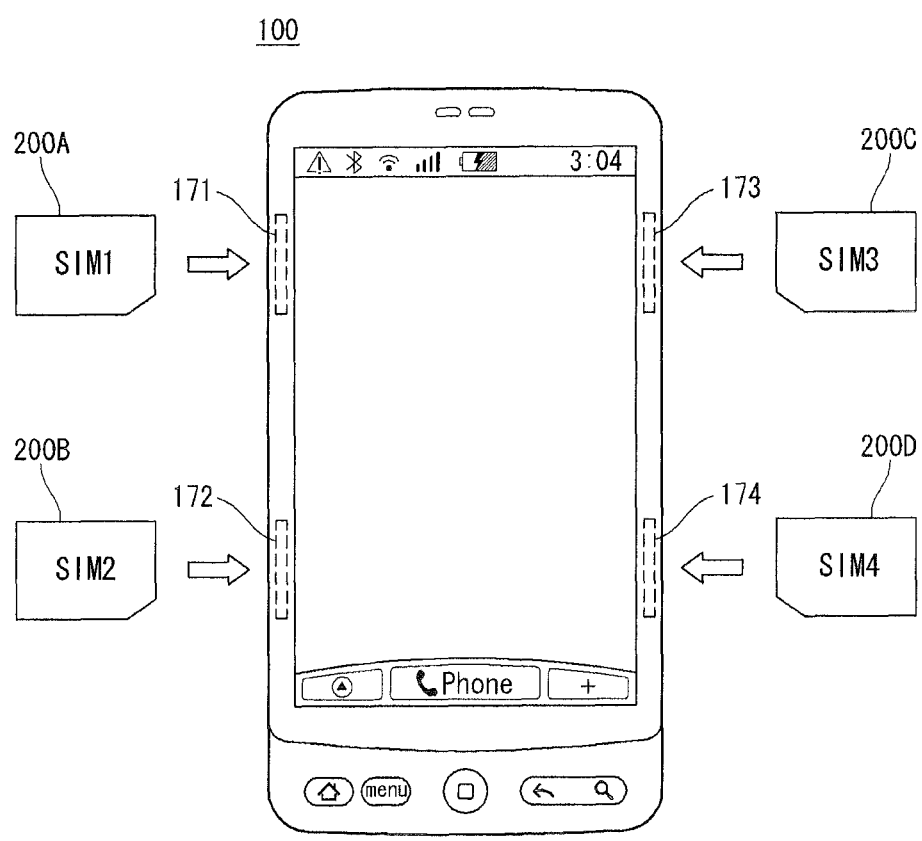
FIG. 2 shows that corresponding SIM cards, from among a plurality of SIM cards in which different OSs are installed, may be mounted on a plurality of SIM card slots of the mobile terminal according to an embodiment of this document.

FIG. 2 shows that corresponding SIM cards, from among a plurality of SIM cards 200A to 200D in which different OSs are installed, may be mounted on a plurality of SIM card slots 171 to 174 of the mobile terminal 100 according to an embodiment of this document. User ID information for user certification and a different OS are stored in each of the plurality of SIM cards 200A to 200D. Corresponding SIM cards, from among the plurality of SIM cards, may be mounted on the plurality of respective SIM card slots 171 to 174.

Assuming that the mobile terminal 100 is a smart phone, corresponding OSs, from among the iOS, Android OS, Symbian OS, LIMO OS, and Win Mobile OS, may be installed in the plurality of respective SIM cards 200A to 200D. However, the scope of this document is not limited thereto. For example, the OSs installed in the plurality of SIM cards 200A to 200D may be changed according to the types of mobile terminals or the development of future related technologies.

A user may select an SIM card in which an OS for driving the mobile terminal 100 is installed from among the plurality of SIM cards and mount the selected SIM card on a corresponding SIM card slot from among the SIM card slots 171 to 174. The controller 180 may execute the OS installed in the SIM card mounted on the corresponding SIM card slot and perform user certification on the basis of the user ID information stored in the mounted SIM card, thus being capable of driving the mobile terminal 100.

Figure 3:
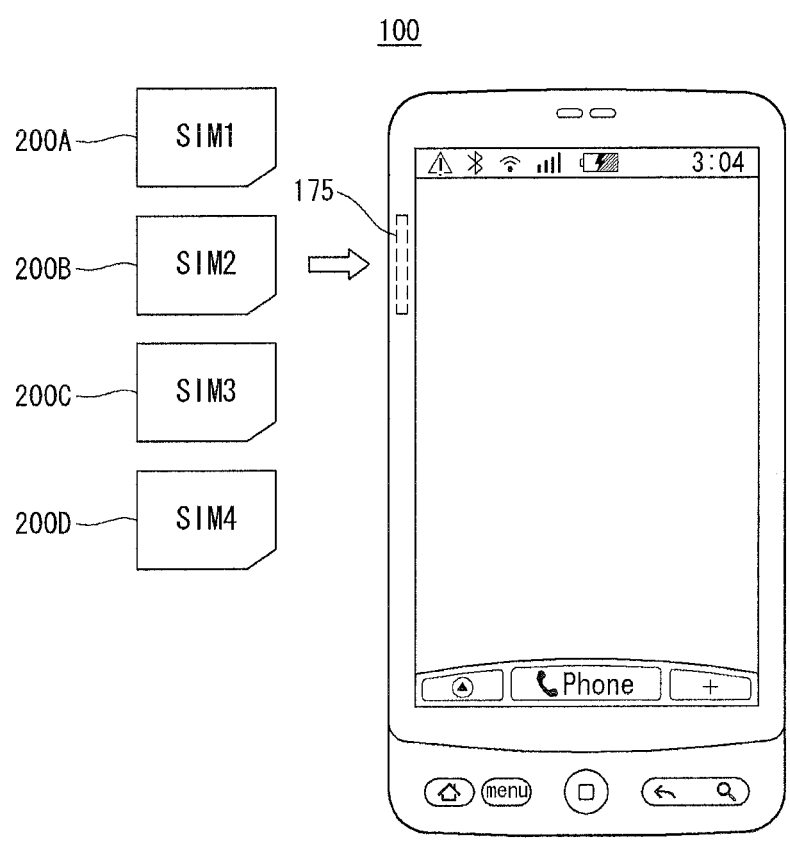
FIG. 3 shows that a plurality of SIM cards may be selectively mounted on one SIM card slot of the mobile terminal according to an embodiment of this document.

FIG. 3 shows that a plurality of SIM cards 200A to 200D may be selectively mounted on one SIM card slot 175 of the mobile terminal 100 according to an embodiment of this document. User ID information for user certification and a different OS are stored in each of the plurality of SIM cards 200A to 200D. The plurality of SIM cards 200A to 200D may be mounted on the SIM card slot 175.

A user may select an SIM card in which an OS for driving the mobile terminal 100 is installed, from among the plurality of SIM cards 200A to 200D, and mount the selected SIM card on the SIM card slot 175. The controller 180 may drive the mobile terminal 100 by executing the OS installed in the SIM card mounted on the SIM card slot 175 and perform user certification on the basis of the user ID information stored in the SIM card mounted on the SIM card slot 175.

In FIGS. 2 and 3, in case where a specific application to be used by a user is executed only in a specific OS, the user may use the specific application by driving the mobile terminal 100 by mounting an SIM card having the specific OS stored therein, from among the plurality of SIM cards 200A to 200D, on the mobile terminal 100.

FIG. 1 shows that the SIM card is separated from the controller 180 and the memory 160. However, this is only illustrative, and at least a part of the controller and the memory, which may dispose in a main body of general mobile terminal, may be mounted on each of the SIM cards 200A to 200D shown in FIGS. 2 and 3, according to some implementations of this document.

For example, first memory for storing a specific OS may be disposed in each of the plurality of SIM cards 200A to 200D. For example, the first memory may be formed of nonvolatile memory (for example, flash memory) capable of storing the OS although power supplied to the mobile terminal 100 is stopped.

A Central Processing Unit (hereinafter referred to as a 'CPU') included in the controller 180 and second memory configured to enable the CPU to load and execute an OS stored in the first memory may be included in each of the plurality of SIM cards 200A to 200D. For example, the second memory may be formed of volatile memory (for example, Random Access Memory (RAM)) for temporarily storing data necessary to execute the OS.

As described above, in the mobile terminal 100 according to this document, hardware elements which may be disposed in a main body of a common mobile terminal, are disposed in each of the plurality of SIM cards 200A to 200D. Accordingly, the hardware configuration of the main body of the mobile terminal 100 can be further simplified. The price of the main body of the mobile terminal 100 is lowered because the configuration of the main body of the mobile terminal 100 is simplified. Accordingly, a user who owns an SIM card can select the main bodies of various and cheap mobile terminals according to his taste.

The characteristics of the mobile terminal 100, occurring when hardware elements which may be disposed in the main body of the common mobile terminal, are disposed in each of the plurality of SIM cards 200A to 200D, are described in more detail later with reference to FIGS. 12 to 15.

Figure 4:
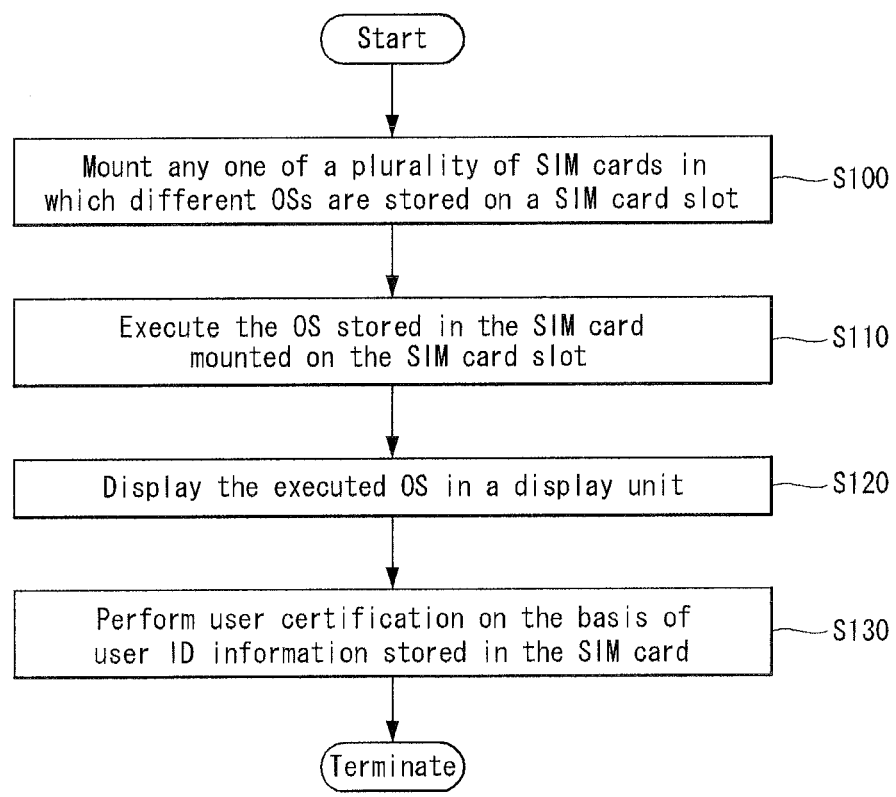
FIG. 4 is a flowchart illustrating a method of driving the mobile terminal according to an embodiment of this document.
Figure 5:
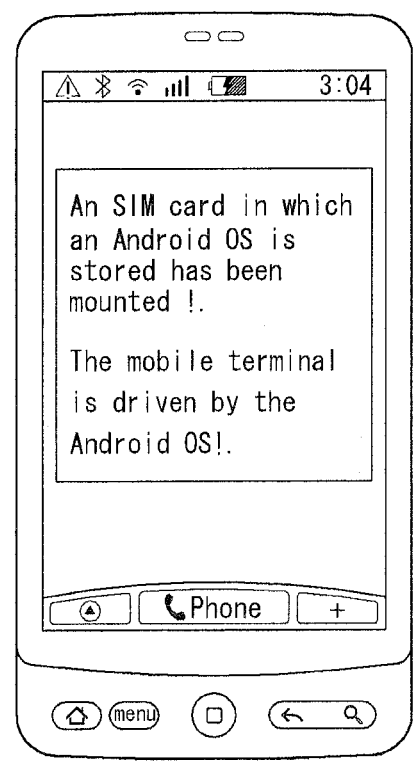
FIG. 5 shows that a message, indicating that the mobile terminal is driven by an OS installed in an SIM card mounted on an SIM card slot, is displayed in a display unit in a process of executing the method of driving the mobile terminal shown in FIG. 4.
Figure 6:
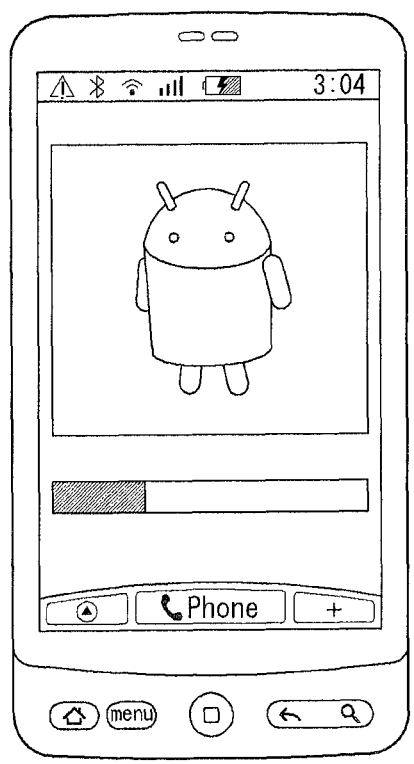
FIG. 6 shows that the mobile terminal is booted by an OS installed in an SIM card mounted on an SIM card slot in a process of executing the method of driving the mobile terminal shown in FIG. 4.

FIG. 4 is a flowchart illustrating a method of driving the mobile terminal according to an embodiment of this document. FIG. 5 shows that a message, indicating that the mobile terminal 100 is driven by an OS installed in an SIM card mounted on the SIM card slot 175, is displayed in the display unit 151 in a process of executing the method of driving the mobile terminal shown in FIG. 4. FIG. 6 shows that the mobile terminal 100 is booted by an OS installed in an SIM card mounted on the SIM card slot 175 in a process of executing the method of driving the mobile terminal shown in FIG. 4.

Hereinafter, the process of executing the method of driving the mobile terminal is described with reference to FIGS. 1, 3, and 4 through 6.

First, a user mounts any one SIM card in which an OS to be executed is installed, from among the plurality of SIM cards 200A to 200D having different OSs stored therein, on the SIM card slot 175 at step S100. When the one SIM card is mounted on the SIM card slot 175, the power supply 190 supplies power to the one SIM card through the interface unit 170.

Next, the controller 180 executes the OS installed in the one SIM card at step S110 and displays the executed OS in the display unit 151 at step S120. From FIG. 5, it can be seen that a message, indicating that an Android OS is installed in the one SIM card and the mobile terminal 100 is driven by the Android OS, is displayed in the display unit 151. From FIG. 6, it can be seen that the mobile terminal 100 is booted by the Android OS installed in the one SIM card.

When boot is completed by the OS installed in the one SIM card, the controller 180 performs user certification on the basis of user ID information stored in the one SIM card at step S130. When the user certification is completed by the controller 180, a user may use various application stored in the memory 160.

Figure 7:
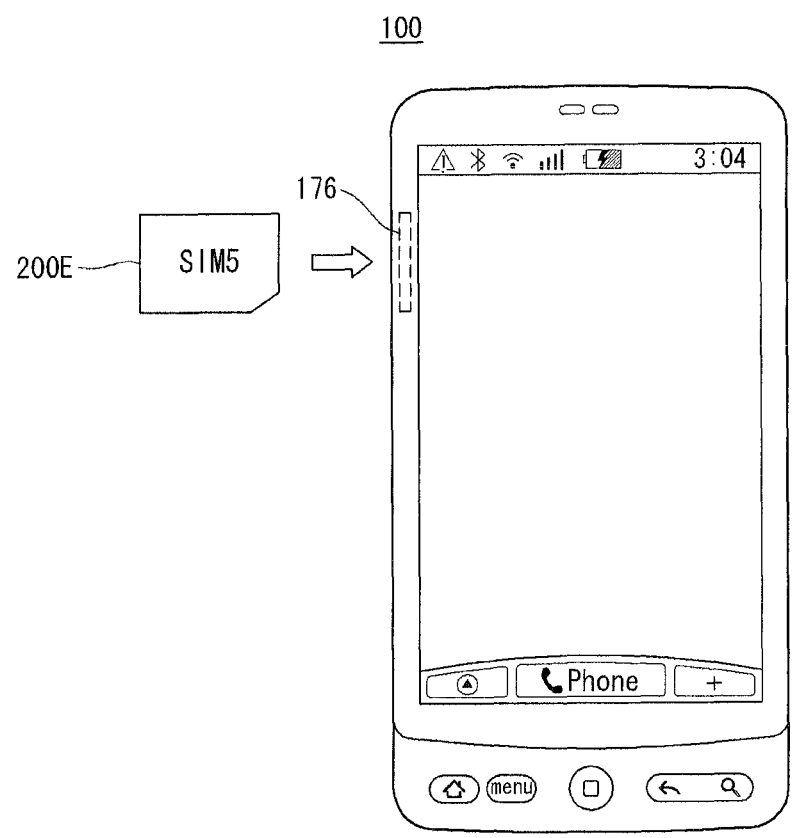
FIG. 7 shows that an SIM card having a plurality of OSs stored therein is mounted on one SIM card slot of the mobile terminal according to an embodiment of this document.

FIG. 7 shows that an SIM card 200E having a plurality of OSs stored therein is mounted on one SIM card slot 176 of the mobile terminal 100 according to an embodiment of this document. User ID information for user certification and a plurality of different OSs are stored in the SIM card 200E, and the SIM card 200E may be mounted on the SIM card slot 176.

Assuming that the mobile terminal 100 is a smart phone, the plurality of OSs may comprise the iOS, Android OS, Symbian OS, LIMO OS, and Win Mobile OS. However, the scope of this document is not limited thereto. For example, the plurality of OSs may be changed according to the types of mobile terminals or the development of future related technologies.

A user may select an OS for driving the mobile terminal 100 from among the plurality of OSs installed in the SIM card 200E. The controller 180 may drive the mobile terminal 100 by executing the selected OS. Next, the controller 180 may perform user certification on the basis of the user ID information stored in the SIM card 200E.

Hardware elements, which may be disposed in a main body of a common mobile terminal, may also be disposed in the SIM card 200E shown in FIG. 7, like the plurality of SIM cards 200A to 200D shown in FIGS. 2 and 3.

Figure 8:
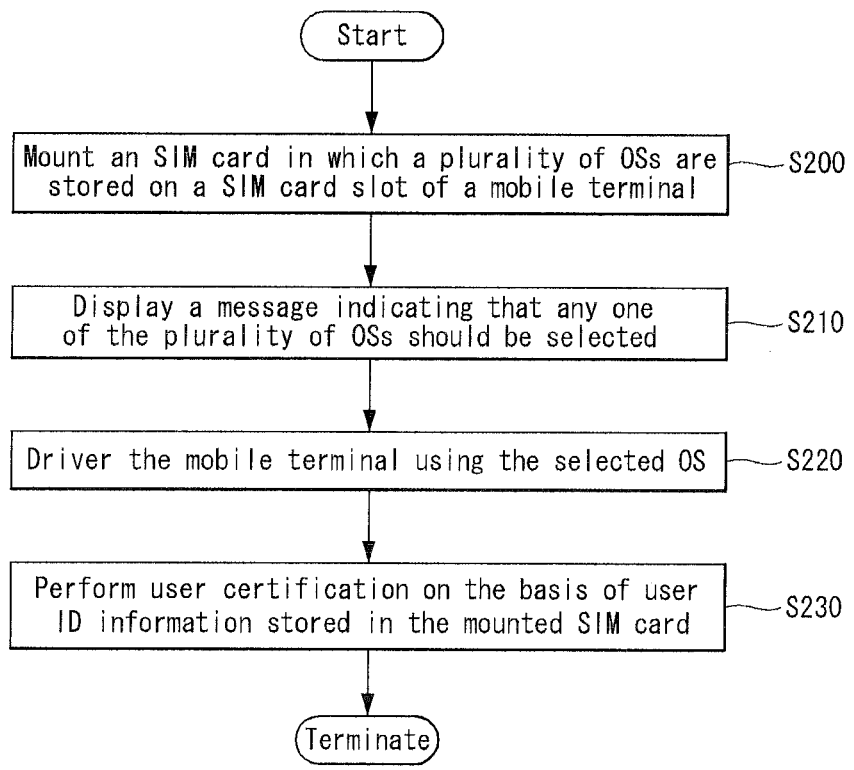
FIG. 8 is a flowchart illustrating a method of driving the mobile terminal according to another embodiment of this document.
Figure 9:
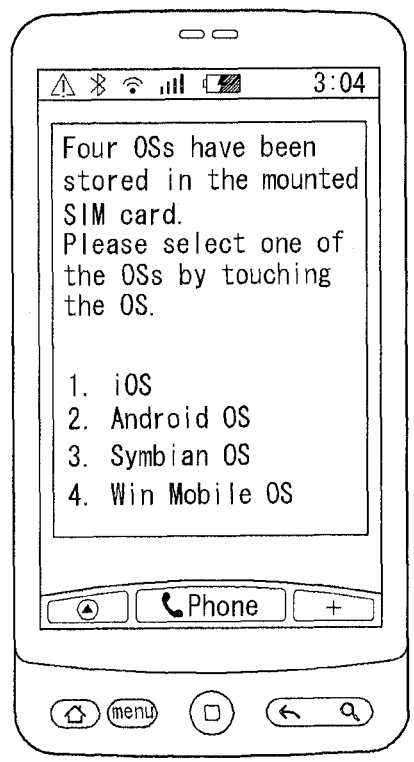
FIG. 9 shows that a message, indicating that one of the plurality of OSs installed in the SIM card should be selected, is displayed in the display unit in a process of executing the method of driving the mobile terminal shown in FIG. 8.
Figure 10:
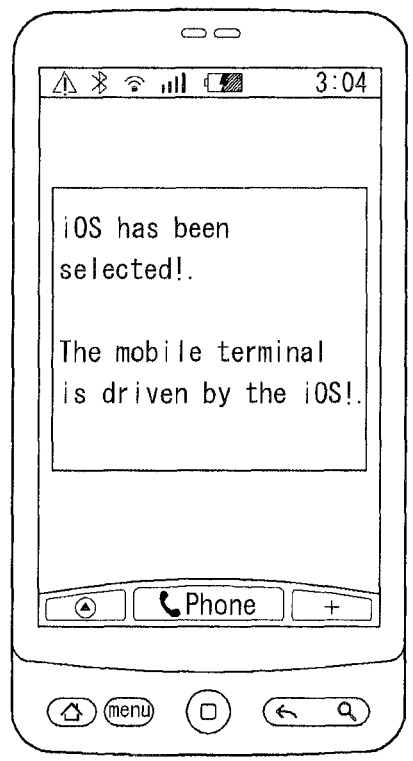
FIG. 10 shows that a message, indicating that a specific OS of the plurality of OSs installed in the SIM card has been selected, is displayed in the display unit in a process of executing the method of driving the mobile terminal shown in FIG. 8.
Figure 11:
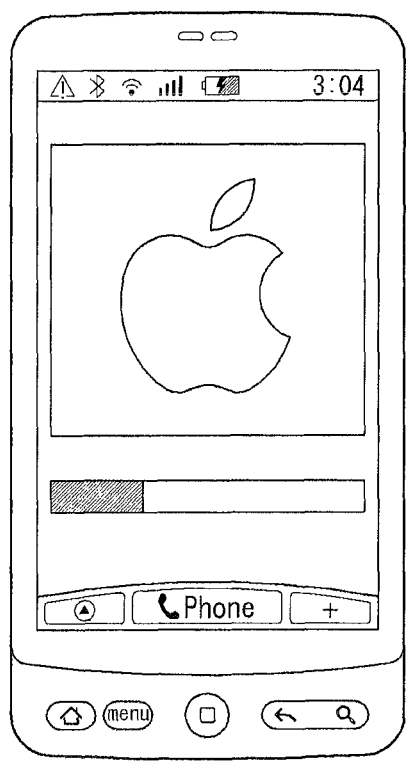
FIG. 11 shows that the mobile terminal is booted by an OS selected from among the plurality of OSs installed in the SIM card in a process of executing the method of driving the mobile terminal shown in FIG. 8.

FIG. 8 is a flowchart illustrating a method of driving the mobile terminal according to another embodiment of this document. FIG. 9 shows that a message, indicating that one of the plurality of OSs installed in the SIM card 200E should be selected, is displayed in the display unit 151 in a process of executing the method of driving the mobile terminal shown in FIG. 8. FIG. 10 shows that a message, indicating that a specific OS of the plurality of OSs installed in the SIM card 200E has been selected, is displayed in the display unit 151 in a process of executing the method of driving the mobile terminal shown in FIG. 8. FIG. 11 shows that the mobile terminal 100 is booted by an OS selected from among the plurality of OSs installed in the SIM card 200E in a process of executing the method of driving the mobile terminal shown in FIG. 8.

Hereinafter, the process of executing the method of driving the mobile terminal is described with reference to FIGS. 1, 7, and 8 to 11.

First, a user mounts the SIM card 200E having the plurality of different OSs stored therein on the SIM card slot 176 at step S200. When the SIM card 200E is mounted on the SIM card slot 176, the power supply 190 supplies power to the SIM card 200E through the interface unit 170.

Next, the controller 180 displays a message, indicating that any one of the plurality of OSs installed in the SIM card 200E should be selected in the display unit 151 at step S210. Referring to FIGS. 9 and 10, it can be seen that the iOS, Android OS, Symbian OS, and Win Mobile OS are installed in the SIM card 200E and the user has selected the iOS from among the plurality of OSs.

When any one of the plurality of OSs is selected, the controller 180 drives the mobile terminal 100 by executing the selected OS at step S220. From FIG. 11, it can be seen that the mobile terminal 100 is booted by the iOS executed by the controller 180.

When boot by the selected OS is completed, the controller 180 performs user certification on the basis of the user ID information stored in the SIM card 200E at step S230. When the user certification is completed by the controller 180, the user may use various applications stored in the memory 160.

The characteristics of the mobile terminal 100 occurring when various OSs are installed in an SIM card have been chiefly described with reference to FIGS. 2 to 11. Hereinafter, the characteristics of the mobile terminal 100, occurring when hardware other than the identity module is disposed in an SIM card, are chiefly described with reference to FIGS. 12 to 15.

Figure 12:
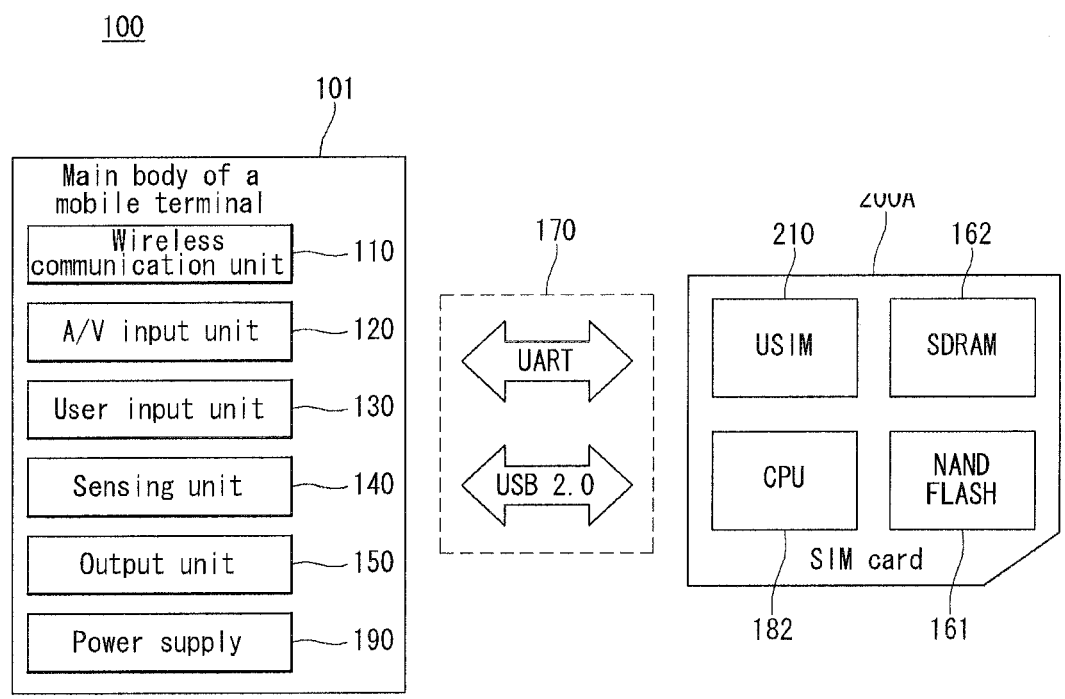
FIG. 12 is a block diagram of the mobile terminal in which a CPU included in an SIM card executes an OS according to an embodiment of this document.

FIG. 12 is a block diagram of the mobile terminal 100 in which a CPU 182 included in an SIM card 200A executes an OS according to an embodiment of this document. From FIG. 12, it can be seen that the CPU 182 (that is, a representative element of a controller disposed in the main body of a common mobile terminal) and nonvolatile memory 161 and volatile memory 162 (that is, representative elements of memory disposed in the main body of the common mobile terminal) are included in the SIM card 200A. For reference, other elements that may be included in the controller and other elements that may be included in the memory are not shown in FIG. 12, for convenience of description. The same principle applies to FIG. 14.

In FIG. 12, the nonvolatile memory 161 is formed of NAND flash memory and the volatile memory 162 is formed of SDRAM, but the scope of this document is not limited thereto. The same principle applies to FIG. 14.

At least one OS for driving the mobile terminal 100 may be stored in the nonvolatile memory 161. Various applications executable in the mobile terminal 100 may be stored in the nonvolatile memory 161. However, the various applications may be stored in additional nonvolatile memory (not shown) disposed in the main body 101 of the mobile terminal 100 according to implementations of this document.

The CPU 182 may load the OS, stored in the nonvolatile memory 161, into the volatile memory 161 and execute the OS, thereby being capable of driving the mobile terminal 100. Next, the CPU 182 may perform user certification on the basis of user ID information stored in an identity module USIM 210. After the user certification is completed, a user may execute the various applications.

The SIM card 200A and the main body 101 of the mobile terminal 100 are connected by the interface unit 170. From FIG. 12, it can be seen that the interface unit 170 interfaces the SIM card 200A and the main body 101 of the mobile terminal 100 using a Universal Asynchronous Receiver/Transmitter (UART), Universal Serial Bus (USB) 2.0 or the like. However, the scope of this document is not limited thereto.

Figure 13:
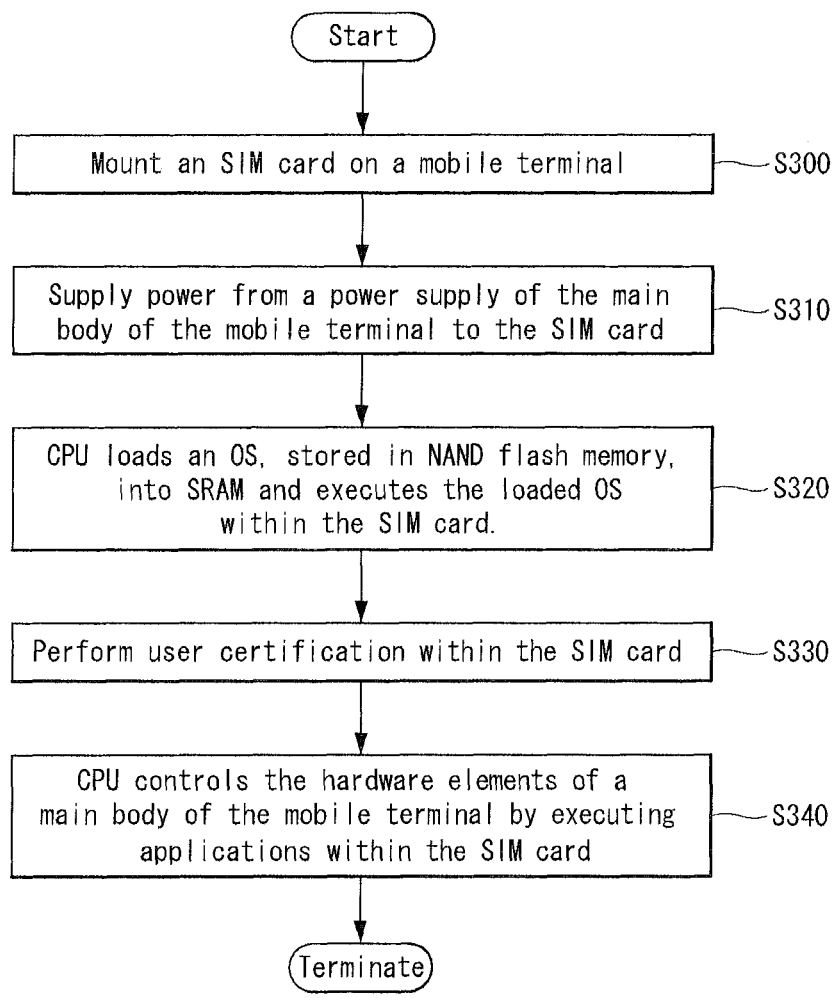
FIG. 13 is a flowchart illustrating an example of a method of driving the mobile terminal shown in FIG. 12.

FIG. 13 is a flowchart illustrating an example of a method of driving the mobile terminal shown in FIG. 12. Hereinafter, the method of driving the mobile terminal 100 is described with reference to FIGS. 12 and 13.

When a user mounts the SIM card 200A having a specific OS stored therein on the mobile terminal 100 at step S300, the power supply 190 of the main body 101 of the mobile terminal 100 supplies power to the SIM card 200A at step S310. When power is supplied from the power supply 190, the CPU 182 may load the OS, stored in the NAND flash memory 161, into the SDRAM 162 and execute the OS within the SIM card 200A at step S320.

When boot is completed by the execution of the OS, the CPU 182 may execute user certification on the basis of user ID information stored in USIM 210 within the SIM card 200A at step S330. When the user certification is completed, the CPU 182 may control hardware elements disposed in the main body 101 of the mobile terminal 100 by executing applications stored in the NAND flash memory 161, within the SIM card 200A at step S340.

In the mobile terminal 100 described with reference to FIGS. 12 and 13, the CPU 182 included in the SIM card 200A may load the OS, stored in the NAND flash memory 161 of the SIM card 200A, into the SDRAM 162 of the SIM card 200A and execute the OS.

Furthermore, in the mobile terminal 100 described with reference to FIGS. 12 and 13, the CPU 182 included in the SIM card 200A may load the applications, stored in the NAND flash memory 161 of the SIM card 200A or the nonvolatile memory of the main body 101 of the mobile terminal 100, into the SDRAM 162 of the SIM card 200A and execute the applications.

Figure 14:
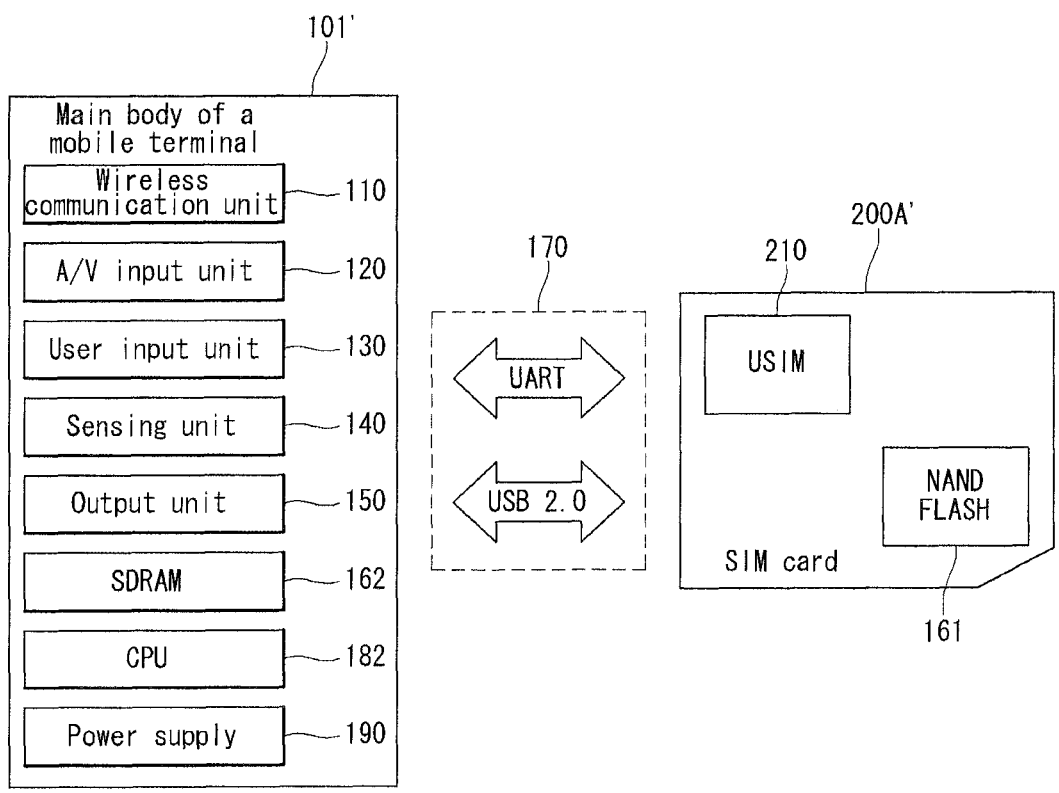
FIG. 14 is a block diagram of the mobile terminal in which the CPU included in the main body of the mobile terminal executes an OS installed in an SIM card according to another embodiment of this document.

FIG. 14 is a block diagram of the mobile terminal in which a CPU 182 included in the main body of the mobile terminal executes an OS installed in an SIM card according to another embodiment of this document. From FIG. 14, it can be seen that a USIM 210 and nonvolatile memory 161 disposed in the main body of a common mobile terminal are included in a SIM card 200A'.

At least one OS for driving the mobile terminal 100 may be stored in the nonvolatile memory 161. Various applications executable in the mobile terminal 100 may be stored in the nonvolatile memory 161. However, the various applications may be stored in additional nonvolatile memory (not shown) disposed in the main body 101 of the mobile terminal 100 according to implementations of this document.

The CPU 182 disposed in the main body 101 of the mobile terminal 100 may drive the mobile terminal 100 by loading the OS, stored in the nonvolatile memory 161, into SDRAM 162 disposed in the main body 101 of the mobile terminal 100 and executing the OS. Next, the CPU 182 may perform user certification on the basis of user ID information stored in the USIM 210 mounted on the SIM card 200A'.

Figure 15:
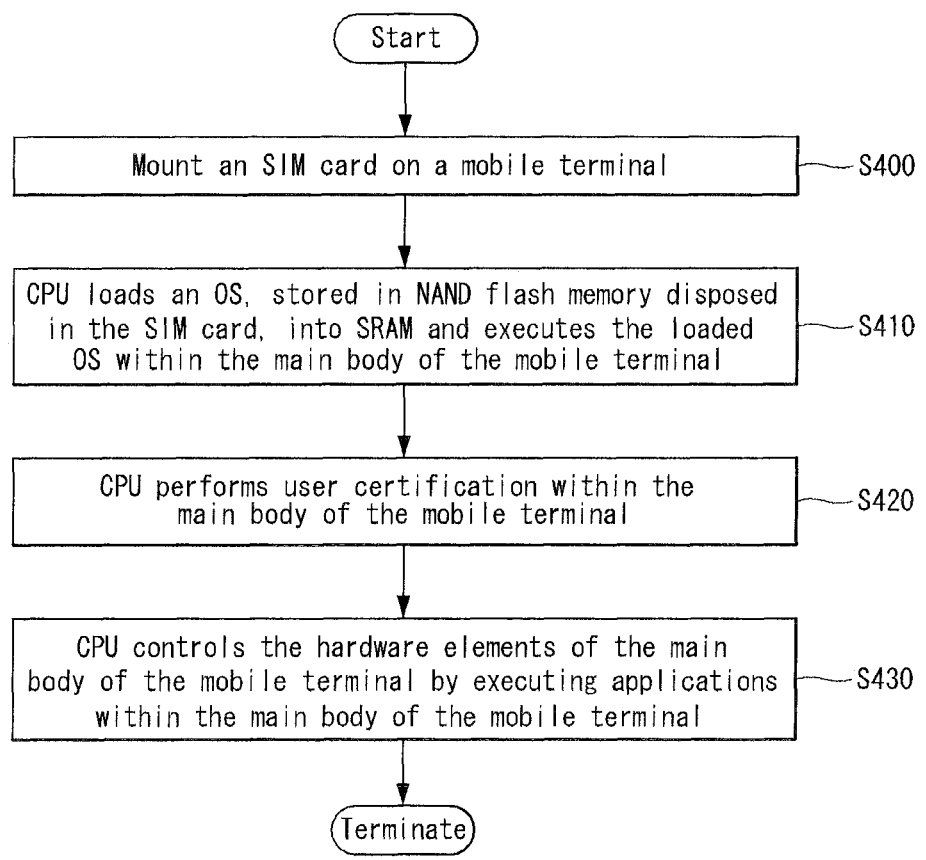
FIG. 15 is a flowchart illustrating an example of a method of driving the mobile terminal shown in FIG. 14.

FIG. 15 is a flowchart illustrating an example of a method of driving the mobile terminal shown in FIG. 14. Hereinafter, the method of driving the mobile terminal 100 is described with reference to FIGS. 14 and 15.

When a user mounts the SIM card 200A', having a specific OS stored therein, on the mobile terminal 100 at step S400, the power supply 190 of the main body 101 of the mobile terminal 100 supplies power to the SIM card 200A'. When power is supplied from the power supply 190, the CPU 182 may load the OS, stored in the NAND flash memory 161 disposed in the SIM card 200A', into the SDRAM 162 disposed in the main body 101 of the mobile terminal 100 and execute the OS within the main body 101 of the mobile terminal 100 at step S410.

When boot is completed by the execution of the OS, the CPU 182 may perform user certification on the basis of user ID information stored in the USIM 210 within the main body 101 of the mobile terminal 100 at step S420. When the user certification is completed, the CPU 182 may control hardware elements disposed in the main body 101 of the mobile terminal 100 by executing applications stored in the NAND flash memory 161 of the SIM card 200A' or additional nonvolatile memory disposed in in the main body 101 of the mobile terminal 100 at step S430.

In the mobile terminal 100 described with reference to FIGS. 14 and 15, the CPU 182 disposed in the main body 101 of the mobile terminal 100 may load the OS, stored in the NAND flash memory 161 of the SIM card 200A, into the SDRAM 162 disposed in the main body 101 of the mobile terminal 100 and execute the OS.

Furthermore, in the mobile terminal 100 described with reference to FIGS. 14 and 15, the CPU 182 disposed in the main body 101 of the mobile terminal 100 may load the applications, stored in the NAND flash memory 161 of the SIM card 200A, into the SDRAM 162 disposed in the main body 101 of the mobile terminal 100 and execute the applications.

The above-described method of operating the mobile terminal may be written as computer programs and may be implemented in digital microprocessors that execute the programs using a computer readable recording medium. The method of controlling the mobile terminal may be executed through software. The software may include code segments that perform required tasks. Programs or code segments may also be stored in a processor readable medium or may be transmitted according to a computer data signal combined with a carrier through a transmission medium or communication network.

The computer readable recording medium may be any data storage device that can store data that can be thereafter read by a computer system. Examples of the computer readable recording medium may include read-only memory (ROM), random-access memory (RAM), CD-ROMs, DVD±ROM, DVD-RAM, magnetic tapes, floppy disks, optical data storage devices. The computer readable recording medium may also be distributed over network coupled computer systems so that the computer readable code is stored and executed in a distribution fashion.

Any reference in this specification to "one embodiment," "an embodiment," "example embodiment," etc., means that a particular feature, structure, or characteristic described in connection with the embodiment is included in at least one embodiment of the invention. The appearances of such phrases in various places in the specification are not necessarily all referring to the same embodiment. Further, when a particular feature, structure, or characteristic is described in connection with any embodiment, it is submitted that it is within the purview of one skilled in the art to effect such feature, structure, or characteristic in connection with other ones of the embodiments.

Although embodiments have been described with reference to a number of illustrative embodiments thereof, it should be understood that numerous other modifications and embodiments can be devised by those skilled in the art that will fall within the spirit and scope of the principles of this disclosure. More particularly, various variations and modifications are possible in the component parts and/or arrangements of the subject combination arrangement within the scope of the disclosure, the drawings and the appended claims. In addition to variations and modifications in the component parts and/or arrangements, alternative uses will also be apparent to those skilled in the art.

Any reference in this specification to "one embodiment," "an embodiment," "example embodiment," etc., means that a particular feature, structure, or characteristic described in connection with the embodiment is included in at least one embodiment of the invention. The appearances of such phrases in various places in the specification are not necessarily all referring to the same embodiment. Further, when a particular feature, structure, or characteristic is described in connection with any embodiment, it is submitted that it is within the purview of one skilled in the art to affect such feature, structure, or characteristic in connection with other ones of the embodiments.

Although embodiments have been described with reference to a number of illustrative embodiments thereof, it should be understood that numerous other modifications and embodiments can be devised by those skilled in the art that will fall within the spirit and scope of the principles of this disclosure. More particularly, various variations and modifications are possible in the component parts and/or arrangements of the subject combination arrangement within the scope of the disclosure, the drawings and the appended claims. In addition to variations and modifications in the component parts and/or arrangements, alternative uses will also be apparent to those skilled in the art.

What is claimed is:

1. A mobile terminal, comprising:
a main body;
a display module; and
a receiving device configured to be provided in the main body and to receive an identity module,
wherein the identity module comprises:
a first memory configured to store a plurality of Operating Systems (OSs) for operating the mobile terminal and an user identification (ID) information, and at least one application program for the mobile terminal;
a second memory configured to temporarily store data necessary to operate the mobile terminal; and
a controller configured to:
display, on the display module, a graphic user interface (GUI) for selecting any one of the plurality of OSs;
when a specific OS is selected through the GUI displayed on the display module, load the specific OS into the second memory and execute the specific OS, load the user ID information into the second memory and perform a user certification based on the loaded user ID information, and load the application into the second memory and execute the loaded application program.

2. The mobile terminal of claim 1, wherein the at least one application is dedicated for the specific OS.

3. The mobile terminal of claim 1, further comprising:

an input unit to select any one of the plurality of OSs through the GUI.

4. The mobile terminal of claim 1, wherein the receiving device includes a card slot, and the identity module includes an identity module card.

5. An identity module card, comprising:

a first memory configured to store a plurality of Operating Systems (OSs) for operating the mobile terminal and a user identification (ID) information, and at least one application program for a mobile terminal;

a second memory configured to temporarily store data necessary to operate the mobile terminal; and a controller configured to:

when the identity module card is provided at the mobile terminal, display, on a display module of the mobile terminal, a graphic user interface (GUI) for selecting any one of the plurality of OSs;

when a specific OS is selected through the GUI, load the specific OS into the second memory and execute the specific OS, load the user ID information into the second memory and perform a user certification based on the loaded user ID information, and load the application into the second memory and execute the loaded application program.

6. The identity module card of claim 1, wherein the at least one application is dedicated for the specific OS.

7. The identity module card of claim 1, wherein the identity module card is provided at the mobile terminal through a card slot included in the mobile terminal.

\* \* \* \* \*